United States Patent [19]

Kusaka

[11] 4,417,139
[45] Nov. 22, 1983

[54] FOCUS DETECTING APPARATUS
[75] Inventor: Yosuke Kusaka, Kawasaki, Japan
[73] Assignee: Nippon Kogaku K.K., Tokyo, Japan
[21] Appl. No.: 331,317
[22] Filed: Dec. 16, 1981
[30] Foreign Application Priority Data Dec. 26, 1980 [JP] Japan .................................. 55-183695

[51] Int. Cl.³ .................................................. G01J 1/36
[52] U.S. Cl. ........................................ 250/204; 354/25
[58] Field of Search ............. 250/204, 201; 354/25 R; 356/4

[56] References Cited
U.S. PATENT DOCUMENTS 4,264,810 4/1981 Utagawa et al. ..................... 250/204

Primary Examiner—David C. Nelms
Assistant Examiner—Darwin R. Hostetter
Attorney, Agent, or Firm—Fitzpatrick, Cella, Harper & Scinto

[57] ABSTRACT

This specification discloses an apparatus disposed in the light beam from an object passed through an imaging lens for producing an output variable with movement of the image of the object by the imaging lens in the direction of the optical axis. The apparatus produces, when the image of the object is formed on a predetermined imaging plane, an output corresponding to a critical value representative of the in-focus of the imaging lens to the object and produces, when the image of the object is formed at a position deviated from the predetermined imaging plane, an output corresponding to the amount of said deviation. The apparatus includes detector means disposed at a position biased in the direction of the optical axis from the predetermined imaging plane so as to produce an output corresponding to the critical value when the image of the object is formed on a plane biased by a predetermined amount in the direction of the optical axis from the predetermined imaging plane and to produce an output corresponding to the predetermined amount of bias when the image of the object is formed on the predetermined imaging plane, memory means in which a data representative of the predetermined amount of bias is prerecorded, and means for correcting the output of the detector means on the basis of the prerecorded data.

5 Claims, 16 Drawing Figures

FOCUS DETECTING APPARATUS

BACKGROUND OF THE INVENTION

1. Field of the Invention

This invention relates to an apparatus for measuring the distance between an object and the apparatus, and more particularly to an apparatus for detecting the focus of the imaging lens of a camera or the like with respect to an object.

2. Description of the Prior Art

Apparatus for measuring the light from an object passed through an imaging lens such as the phototaking lens of a camera and detecting the amount of deviation of the image plane between the predetermined imaging plane of the lens, for example, the film surface of the camera, and the actual imaging plane of the object are disclosed in U.S. Pat. Nos. 4,185,191 and 4,264,810. In these conventional apparatus, lights emitted from two areas in the exit pupil of the imaging lens which are symmetric with respect to the optical axis are caused to enter a pair of photoelectric conversion element arrays disposed closely adjacent to the predetermined imaging plane of the imaging lens and the outputs of the two arrays are compared, whereby the focus of the imaging lens with respect to the object is detected. From the comparison of the outputs of the two arrays, a critical value can be obtained during in-focus. To achieve strict focus detection, the pair of photoelectric conversion element arrays are required to be disposed with high positional accuracy so that the light-receiving surfaces thereof lie on the predetermined imaging plane of the imaging lens or a plane conjugate therewith. Particularly, in a single lens reflex camera wherein a phototaking lens is utilized as the imaging lens for focus detection, the space in which the photoelectric conversion element arrays are allowed to be disposed is very much limited. Usually, the array for receiving the light reflected by a movable reflecting mirror is disposed in the viewfinder optical system while the array for receiving the light passed through the light-transmitting portion of the reflecting mirror is disposed at the bottom of the mirror box. In any case, the space in which a detector device including the arrays is disposed must be chosen so as not to interfere with the viewfinder light beam or the phototaking light beam.

SUMMARY OF THE INVENTION

It is an object of the present invention to provide a focus detecting apparatus in which the severe positional limitation in the disposition of the photoelectric converter device relative to the imaging lens is eliminated and the degree of freedom of disposition of such device can be increased.

The light-receiving surfaces of the photoelectric conversion element arrays in the focus detecting apparatus according to the present invention can be disposed at a position arbitrarily biased relative to the predetermined imaging plane of the imaging lens. The photoelectric conversion element arrays put out a critical value when the image of an object formed by the imaging lens is formed on the light-receiving surfaces lying at the biased position, and produces an output corresponding to the amount of bias when the image of the object is formed on a predetermined imaging plane. The outputs of the photoelectric conversion element arrays are produced as resultant outputs after correction on the basis of prerecorded data representative of the amount of bias.

The invention will become more fully apparent from the following detailed description thereof taken in conjunction with the accompanying drawings.

DESCRIPTION OF THE PREFERRED EMBODIMENTS

Figure 1:
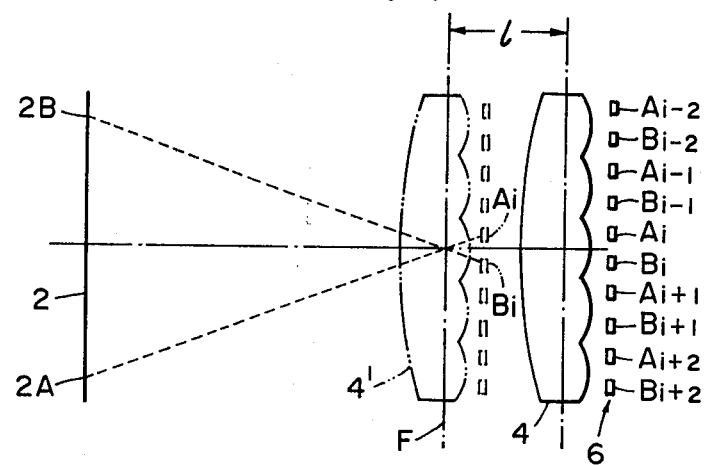
FIG. 1 is a light path illustration schematically showing the focus detecting optical system according to an embodiment of the present invention.

Referring to FIG. 1, there is schematically shown an optical system for detecting the focus according to the present invention. The lights emergent from two areas 2A and 2B in th exit pupil 2 of an imaging lens which are symmetric with respect to the optical axis enters a self-scanning type photoelectric conversion element array 6 such as a CCD type image sensor or an MOS type image sensor through a lenslet array 4 disposed on a plane biased by a distance $l$ in the direction of the optical axis from a predetermined focal plane F. The predetermined focal plane F, in a camera, corresponds to the film surface or a plane conjugate with the film surface. The photoelectric conversion element array 6 comprises a pair of group A and group B each including n elements, and the light from the area 2A in the exit pupil enters the array Ao . . . Ai . . . An of the group A and the light from the area 2B enters the array Bo . . . Bi . . . Bn of the group B. Each array continuously produces an electrical output corresponding to the intensity of light entering each of the elements. Accordingly, the position of the object image by the imaging lens can be detected by comparing the phase differences of the continuous output produced by the array of the group A and the continuous output produced by the array of the group B.

Let it be assumed that a lenslet array 4' is disposed on the predetermined focal plane F as shown by dots-and-dash line. In this assumption, the lenslet array 4' is disposed so that the image of the exit pupil 2 is formed on the light-receiving surface of the photoelectric conversion element array. The output of the photoelectric element array 6' in this case will be described by reference to FIGS. 2A-4B.

Figure 2A:
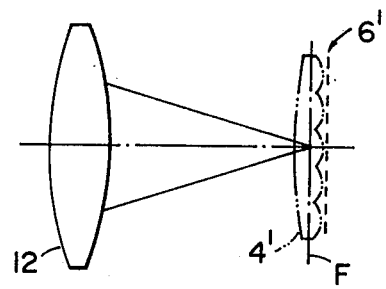
FIGS. 2A-4B show the conditions of the focus detection by the conventional apparatus, FIGS. 2A, 3A and 4A being light path illustrations showing the imaging positions and FIGS. 2B, 3B and 4B being graphs showing the photoelectric outputs.
Figure 2B:
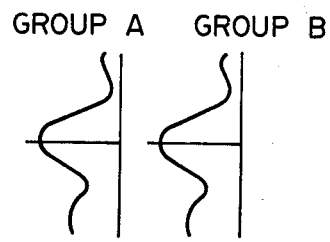

When the imaging lens 12 is in its in-focus condition, two object images formed on the predetermined focal plane F through the two areas in the exit pupil coincide with each other as shown in FIG. 2A. Accordingly, the output of the array of the group A and the output of the array of the group B also coincide with each other without phase deviation as shown in FIG. 2B.

Figure 3A:
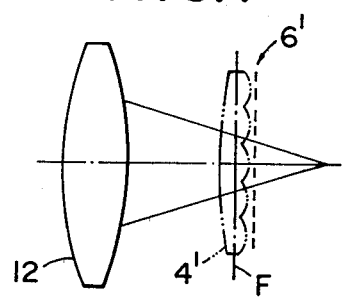
Figure 3B:
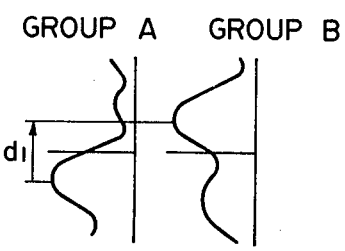

When the imaging lens 12 is in its rear focus condition, the positions of two object images formed through the two areas in the exit pupil create a deviation from each other on the predetermined focal plane F as shown in FIG. 3A. Accordingly, as shown in FIG. 3B, a phase difference $d_1$ is created between the output of the array of the group A and the output of the array of the group B.

Figure 4A:
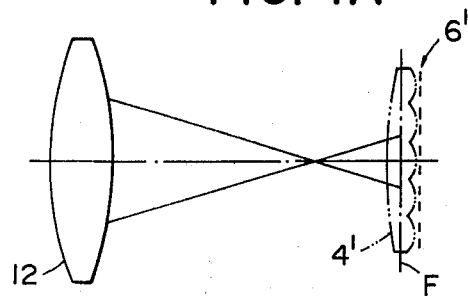
Figure 4B:
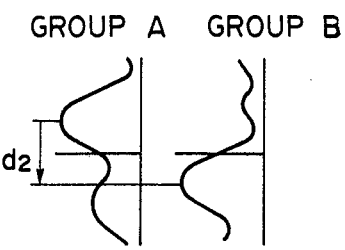

When the imaging lens 12 is in its front focus condition, the positions of two object images formed through the two areas in the exit pupil create a deviation in a direction opposite to the case of the rear focus on the predetermined focal plane F as shown in FIG. 4A. Accordingly, as shown in FIG. 4B, a phase difference $d_2$ opposite to that in the case of the rear focus is created between the output of the array of the group A and the output of the array of the group B. Thus, it is possible to forecast the direction of deviation of the image from the direction of the phase difference and to forecast from the amount of phase difference the amount of movement of the imaging lens 12 in the direction of the optical axis required to attain the in-focus condition.

In contrast, in the apparatus of the present invention designed such that the lights pass through the lenslet array 4 disposed on the plane biased by the distance $l$ in the direction of the optical axis from the predetermined focal plane F and enter the photoelectric element array 6, focus detection is accomplished in the following manner.

Figure 5A:
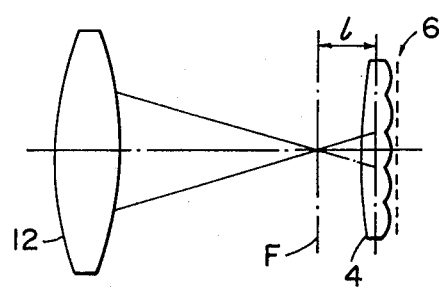
FIGS. 5A-7B show the conditions of the focus detection by the apparatus of the present invention, FIGS. 5A, 6A and 7A being light path illustrations showing the imaging positions and FIGS. 5B, 6B and 7B being graphs showing the photoelectric outputs.
Figure 5B:
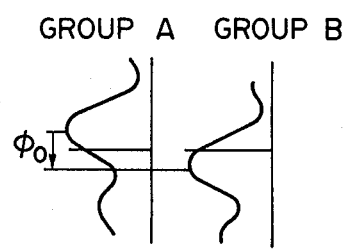
Figure 6A:
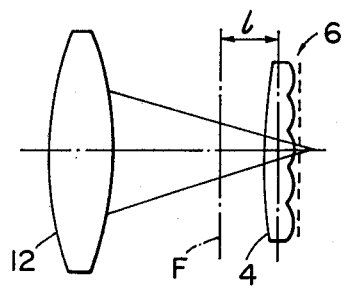
Figure 6B:
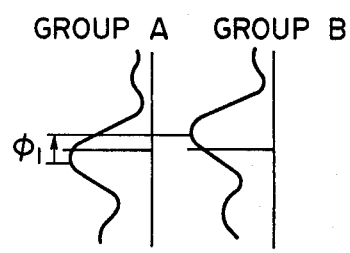
Figure 7A:
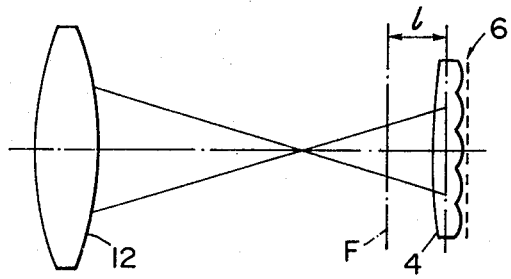
Figure 7B:
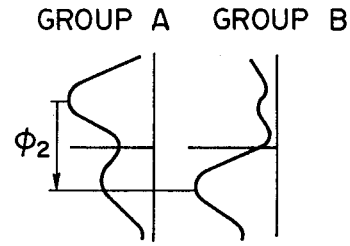

When the imaging lens 12 is forming an object image on the predetermined focal plane F, namely, when the imaging lens 12 is in its in-focus condition, the two object images having passed through the two areas in the exit pupil create a deviation on a shifted plane as shown in FIG. 5A. Accordingly, as shown in FIG. 5B, a phase difference is created between the output of the array of the group A and the output of the array of the group B. In the present embodiment, the lenslet array 4 lies on a plane shifted rearwardly of the predetermined focal plane F and therefore, if the sign of the phase difference is determined with the output of the array of the group A as the reference, the sign of the then phase difference $\phi_0$ is minus. As the relative distance between the imaging lens 12 and the object is varied from the condition of FIG. 5A to provide the rear focus, the absolute value of the phase difference $\phi_0$ gradually becomes smaller. FIG. 6A shows the rear focus condition, and the then output of the array of the group A and the then output of the array of the group B create a phase difference $\phi_1$ inverted in sign as shown in FIG. 6B. When the imaging lens 12 has assumed its front focus condition, the positions of the above-described two object images, as shown in FIG. 7A, create a greater deviation from the deviated positions of the two object images in the in-focus condition. Accordingly, as shown in FIG. 7B, a greater phase difference $\phi_2$ of the same sign as the phase difference in the in-focus condition is created between the output of the array of the group A and the output of the array of the group B.

Figure 8:
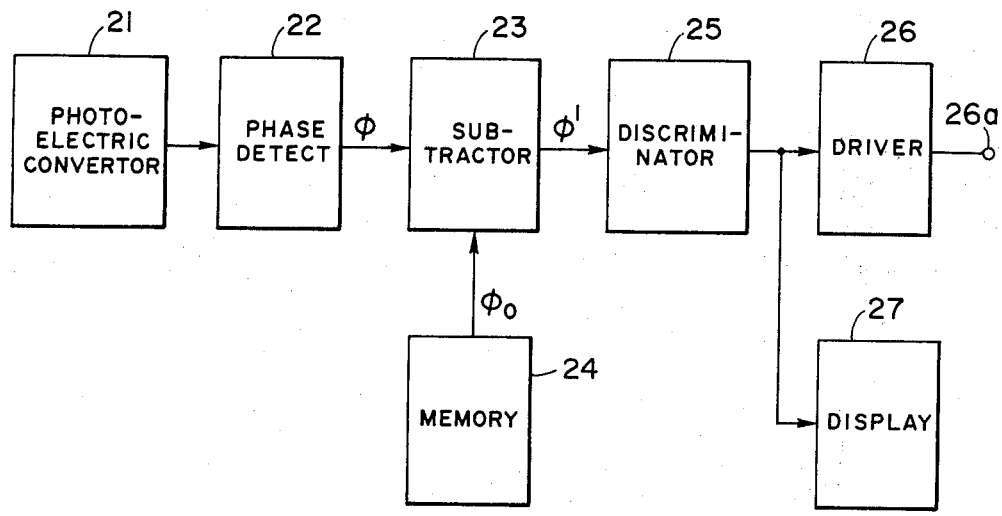
FIG. 8 is a block diagram of a circuit according to an embodiment of the present invention.

The outputs thus obtained are processed by an apparatus shown in FIG. 8. A photoelectric converter circuit 21 including the photoelectric element array sends the output of the array of the group A and the output of the array of the group B to a phase detector device 22. The phase detector device 22 detects the phase difference $\phi$ between the two outputs and sends it to a subtractor 23. The initial phase difference $\phi_0$ during the in-focus is recorded in a memory 24, and the subtractor 23 subtracts the initial phase difference $\phi_0$ from the phase difference $\phi$ and sends a new phase difference $\phi' = \phi - \phi_0$ to a discriminator 25, which judges the in-focus when $\phi' = 0$ and judges the front focus or the rear focus from the sign of $\phi'$ and provides an output to a lens driver 26 and an in-focus condition display device 27. The lens driver 26, in response to the discriminator 25, produces at its output terminal 26a a drive signal for the imaging lens to form an object image on the predetermined focal plane F. The in-focus condition display device 27 displays whether the lens is in the in-focus condition or in the front focus condition or in the rear focus condition. The initial phase difference $\phi_0$ to be recorded in the memory 24 can be determined from the data empirically obtained after the lenslet array 4 and the photoelectric conversion element array 6 have been disposed.

Figure 9:
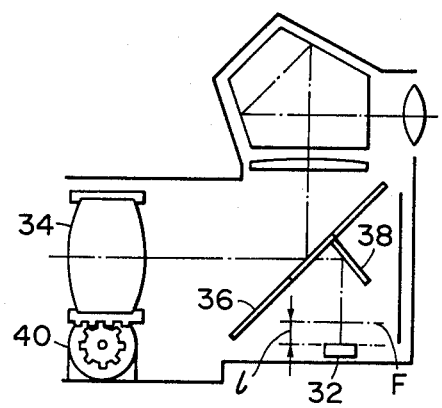
FIG. 9 is a cross-sectional view schematically showing a cameral according to an embodiment of the present invention.

A single lens reflex camera incorporating the above-described focus detecting apparatus thereinto is shown in FIG. 9. A photoelectric converter device 32 including the lenslet array 4 and the photoelectric conversion element array 6 is disposed at the bottom of the camera body below the phototaking light path, and of the light passed through a phototaking lens 34, the light passed through the translucent portion of a quick return mirror 36 is reflected by a sub-mirror 38 and directed to the photoelectric converter device 32.

The phototaking lens 34, for the purpose of focusing, is driven in the direction of the optical axis by an electric motor 40 connected to the output terminal 26a of the driver 26 of FIG. 8. The detecting surface of the photoelectric converter device 32 is placed at a position retracted rearwardly by a distance $l$ from a position F conjugate with the film surface. This rearward retraction can increase the degree of freedom of selection of the position whereat the photoelectric converter means is incorporated into the camera without causing any kick in the film surface.

The foregoing example has been described with respect to a case where focus detection is effected rearwardly relative to the predetermined focal plane F, but the same principle is also applicable to a case where focus detection is effected forwardly relative to the predetermined focal plane F.

Figure 10:
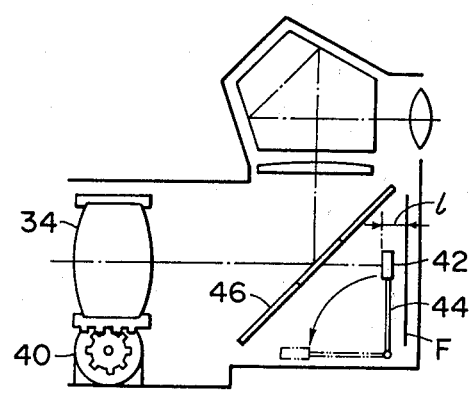
FIG. 10 is a cross-sectional view schematically showing a camera according to another embodiment of the present invention.

FIG. 10 shows an embodiment in the latter case. When the shutter curtain is closed, a photoelectric converter device 42 attached to the end of a pivotable arm 44 can jump up to a position shifted by a distance $l$ forwardly of the film surface F and receive the phototaking light through the translucent portion of a quick return mirror 46 to thereby accomplish focus detection. During photography, the arm 44 is retracted from the phototaking light path.

In the above-described embodiment, the signal obtained from the array of the group A and the signal obtained from the array of the group B have been compared to detect the phase difference therebetween, whereas, of course, the present invention is not restricted to such a focus detecting system.

Further, in an apparatus having a focus detecting optical system which does not use a lenslet array, the light-receiving surfaces of the light-receiving elements of the photoelectric element array or the like may be provided at a position shifted from the predetermined focal plane.

I claim:

1. An apparatus disposed in the light beam from an object passed through an imaging lens for producing an output varialbe with movement of the imagge of the object by said imaging lens in the direction of the optical axis, said apparatus producing, when the image of said object is formed on a predetermined imaging plane, an output corresponding to a critical value representative of the in-focus of said imaging lens to said object and producing, when the image of said object is formed at a position deviated from said predetermined imaging plane, an output corresponding to the amount of said deviation, said apparatus comprising:
   (a) detector means disposed at a position biased in the direction of the optical axis from said predetermined imaging plane so as to procude an output corresponding to said critical value when the image of said object is formed on a plane biased by a predetermined amount in the direction of the optical axis from said predetermined imaging plane and to produce an output corresponding to said predetermined amount of bias when the image of said object is formed on said predetermined imaging plane;
   (b) memory means in which a data representative of said predetermined amount of bias is prerecorded; and
   (c) means for correcting the output of said detector means on the basis of said prerecorded data.

2. An apparatus according to claim 1, wherein said detector means includes:
   (a) first photoelectric converter means disposed at a position closely adjacent to the image of said object formed on said biased plane by the light beam from a first portion of the exit pupil of said imaging lens; and
   (b) second photoelectric converter means disposed at a position closely adjacent to the image of said object formed on said biased plane by the light beam from a second portion of the exit pupil of said imaging lens.

3. An apparatus according to claim 2, wherein said detector means further includes a plurality of lenses each having a second imaging plane and causing the image of the object on said biased plane to be re-imaged on said second imaging plane, and each of said first and second photoelectric converter means is disposed at a position closely adjacent to said second imaging plane.

4. An apparatus according to claim 1, wherein said correcting means includes means for producing an output resulting from subtracting said data from the output of said detector means.

5. A camera including a driver device for displacing a phototaking lens until a detector device disposed in the light beam from an object passed through said phototaking lens for producing an output variable with movement of the image of the object by said phototaking lens in the direction of the optical axis produces an output corresponding to a critical value representative of the fact that the image of said object has been formed on a predetermined imaging plane, said camera comprising:
   (a) detector means disposed at a position biased in the direction of the optical axis from said predetermined imaging plane so as to produce an output corresponding to said critical value when the image of said object is formed on a plane biased by a predetermined amount in the direction of the optical axis from said predetermined imaging plane and to produce an output corresponding to said predetermined amount of bias when the image of said object is formed on said predetermined imaging plane;
   (b) memory means in which a data representative of said predetermined amount of bias is prerecorded;
   (c) means for correcting the output of said detector means on the basis of said prerecorded data; and
   (d) means for causing said driver device to respond to said corrected output for the formation of the image of said object on said predetermined imaging plane.

* * * * *